US008838087B1

(12) United States Patent
Delker et al.

(10) Patent No.: US 8,838,087 B1
(45) Date of Patent: Sep. 16, 2014

(54) PROVISIONING SYSTEM AND METHODS FOR INTERFACELESS PHONE

(75) Inventors: Jason R. Delker, Olathe, KS (US); Sei Y. Ng, Olathe, KS (US); Jeffrey M. Stone, Overland Park, KS (US); Peter S. Syromiatnikov, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 295 days.

(21) Appl. No.: 12/876,220

(22) Filed: Sep. 6, 2010

(51) Int. Cl.
*H04M 3/00* (2006.01)

(52) U.S. Cl.
USPC .......................................................... 455/419

(58) Field of Classification Search
CPC ............ H04W 8/245; H04M 1/72525; H04M 1/72533; H04M 1/7253; H04M 1/7219; H04M 1/72583
USPC .......................................... 455/418–420, 566
See application file for complete search history.

(56) References Cited

U.S. PATENT DOCUMENTS

| | | | |
|---|---|---|---|
| 5,950,200 A | | 9/1999 | Sudai et al. |
| 6,064,975 A | * | 5/2000 | Moon et al. .................. 705/7.13 |
| 6,186,553 B1 | * | 2/2001 | Phillips et al. .................... 283/2 |
| 6,356,838 B1 | * | 3/2002 | Paul ............................. 701/410 |
| 6,622,016 B1 | | 9/2003 | Sladek et al. |
| 6,647,260 B2 | * | 11/2003 | Dusse et al. .................. 455/419 |
| 6,978,132 B1 | | 12/2005 | Sladek et al. |
| 6,986,107 B2 | * | 1/2006 | Hanggie et al. ............... 715/815 |
| 7,031,437 B1 | | 4/2006 | Parsons et al. |
| 7,072,653 B1 | | 7/2006 | Sladek et al. |
| 7,073,130 B2 | | 7/2006 | Novak et al. |
| 7,215,754 B1 | | 5/2007 | Woodson et al. |
| 7,260,382 B1 | * | 8/2007 | Lamb et al. .................... 455/411 |
| 7,260,386 B1 | * | 8/2007 | Haldar et al. ................. 455/417 |
| 7,500,198 B2 | | 3/2009 | Mathews et al. |
| 7,558,953 B2 | | 7/2009 | Osthoff et al. |
| 7,702,322 B1 | | 4/2010 | Maurya et al. |
| 7,930,636 B2 | | 4/2011 | Garbow et al. |

(Continued)

FOREIGN PATENT DOCUMENTS

| | | |
|---|---|---|
| WO | 2009056148 A1 | 5/2009 |
| WO | 2014022446 A1 | 2/2014 |

OTHER PUBLICATIONS

Hollister, Sean, "Apple patent app hints at iPod-based phones, Peel 520 turns shades of green, red, blue and yellow," Engadget, http://www.engadget.com/2010/09/19/apple-patent-app-hints-at-ipod-based-phones-peel-520-turns-shad/, Sep. 19, 2010, p. 1.

(Continued)

*Primary Examiner* — Brandon Miller (57) ABSTRACT

A portable electronic device is provided comprising a processor, a memory, and a provisioning application that detects that the portable electronic device has powered on and received activation for wireless services. The portable electronic device receives a first input selecting installation of an interface pack on the portable electronic device. The portable electronic device receives the interface pack from a remote software distribution site, wherein the interface pack comprises a software installer, a first user application, and a second user application. The portable electronic device also executes the software installer wherein the software installer installs the first user application and installs the second user application on the portable electronic device.

20 Claims, 6 Drawing Sheets

(56) References Cited

U.S. PATENT DOCUMENTS

| | | | |
|---|---|---|---|
| 7,970,386 B2 | 6/2011 | Bhat et al. | |
| 8,012,219 B2 | 9/2011 | Mendez et al. | |
| 8,150,962 B1 | 4/2012 | Wolter | |
| 8,244,277 B1 | 8/2012 | Cha et al. | |
| 8,265,658 B2 | 9/2012 | Issa et al. | |
| 8,270,310 B2 | 9/2012 | Raleigh | |
| 8,270,941 B2* | 9/2012 | Kenagy et al. | 455/405 |
| 8,315,198 B2 | 11/2012 | Corneille et al. | |
| 8,359,016 B2 | 1/2013 | Lindeman et al. | |
| 8,533,605 B1 | 9/2013 | Cha et al. | |
| 8,538,398 B2* | 9/2013 | Wilson et al. | 455/418 |
| 8,559,933 B1 | 10/2013 | Delker et al. | |
| 8,577,334 B1 | 11/2013 | Smith et al. | |
| 8,583,091 B1 | 11/2013 | Delker et al. | |
| 2002/0029169 A1 | 3/2002 | Oki et al. | |
| 2002/0054086 A1* | 5/2002 | Van Oostenbrugge et al. | 345/744 |
| 2002/0054150 A1* | 5/2002 | I'Anson et al. | 345/810 |
| 2002/0101444 A1 | 8/2002 | Novak et al. | |
| 2002/0123335 A1* | 9/2002 | Luna et al. | 455/419 |
| 2002/0142760 A1 | 10/2002 | Gidron et al. | |
| 2002/0167542 A1* | 11/2002 | Florin | 345/745 |
| 2003/0233329 A1 | 12/2003 | Laraki et al. | |
| 2004/0044752 A1* | 3/2004 | Hamaguchi et al. | 709/220 |
| 2004/0171375 A1* | 9/2004 | Chow-Toun | 455/418 |
| 2004/0179034 A1 | 9/2004 | Burritt | |
| 2004/0181678 A1 | 9/2004 | Lee et al. | |
| 2004/0203941 A1 | 10/2004 | Kaplan et al. | |
| 2004/0216054 A1 | 10/2004 | Mathews et al. | |
| 2005/0050474 A1* | 3/2005 | Bells et al. | 715/747 |
| 2005/0071780 A1 | 3/2005 | Muller et al. | |
| 2005/0085272 A1* | 4/2005 | Anderson et al. | 455/566 |
| 2006/0048141 A1 | 3/2006 | Persson et al. | |
| 2006/0085751 A1 | 4/2006 | O'Brien et al. | |
| 2006/0092861 A1 | 5/2006 | Corday et al. | |
| 2006/0190569 A1 | 8/2006 | Neil et al. | |
| 2006/0258289 A1 | 11/2006 | Dua | |
| 2006/0277469 A1 | 12/2006 | Chaudhri et al. | |
| 2007/0067738 A1* | 3/2007 | Flynt et al. | 715/810 |
| 2007/0088851 A1 | 4/2007 | Levkovitz et al. | |
| 2007/0265023 A1 | 11/2007 | Bengtsson et al. | |
| 2007/0268842 A1 | 11/2007 | Wang | |
| 2007/0282914 A1 | 12/2007 | Sivapragasam et al. | |
| 2008/0034309 A1 | 2/2008 | Louch et al. | |
| 2008/0092057 A1 | 4/2008 | Monson et al. | |
| 2008/0192714 A1* | 8/2008 | Kim et al. | 370/338 |
| 2008/0214172 A1 | 9/2008 | Anwer | |
| 2008/0305775 A1 | 12/2008 | Aaltonen et al. | |
| 2008/0319887 A1 | 12/2008 | Pizzi et al. | |
| 2009/0017870 A1 | 1/2009 | An | |
| 2009/0077495 A1 | 3/2009 | Bhat et al. | |
| 2009/0181716 A1 | 7/2009 | Benco et al. | |
| 2009/0186651 A1 | 7/2009 | You | |
| 2009/0228824 A1 | 9/2009 | Forstall et al. | |
| 2009/0254753 A1 | 10/2009 | De Atley et al. | |
| 2009/0307679 A1 | 12/2009 | Lee et al. | |
| 2010/0005196 A1 | 1/2010 | Wolff-Petersen | |
| 2010/0030901 A1 | 2/2010 | Hallberg et al. | |
| 2010/0060549 A1 | 3/2010 | Tsern | |
| 2010/0115438 A1 | 5/2010 | Chu | |
| 2010/0184422 A1* | 7/2010 | Ahrens | 455/419 |
| 2010/0190478 A1 | 7/2010 | Brewer et al. | |
| 2010/0197219 A1 | 8/2010 | Issa et al. | |
| 2010/0234051 A1 | 9/2010 | Holden et al. | |
| 2010/0281427 A1 | 11/2010 | Ghosh et al. | |
| 2011/0072121 A1 | 3/2011 | Takasugi et al. | |
| 2011/0161149 A1 | 6/2011 | Kaplan | |
| 2011/0210933 A1 | 9/2011 | Forstall | |
| 2011/0238496 A1 | 9/2011 | Gurbuxani et al. | |
| 2011/0295980 A1 | 12/2011 | Aldis et al. | |
| 2011/0314389 A1 | 12/2011 | Meredith et al. | |
| 2012/0016735 A1 | 1/2012 | Park et al. | |
| 2012/0102428 A1 | 4/2012 | Stewart | |
| 2012/0102547 A1 | 4/2012 | Fransdonk | |
| 2012/0117478 A1 | 5/2012 | Vadde et al. | |
| 2012/0155292 A1 | 6/2012 | Zazula et al. | |
| 2014/0036697 A1 | 2/2014 | Annan et al. | |

OTHER PUBLICATIONS

Delker, Jason R., et al., Patent Application entitled "System and Method for ID Platform," filed Feb. 8, 2011, U.S. Appl. No. 13/023,486.

Delker, Jason R., et al., Patent Application entitled "Dynamic Loading, Unloading, and Caching of Alternate Complete Interfaces," filed Sep. 6, 2010, U.S. Appl. No. 12/876,221.

Delker, Jason R., et al., Patent Application entitled "Shared ID with Second Party," filed Jan. 31, 2011, U.S. Appl. No. 13/018,083.

Delker, Jason R., et al., Patent Application entitled "Extending ID to a Computer System," filed May 27, 2011, U.S. Appl. No. 13/118,058.

Davis, John M., et al., Patent Application entitled "Mirroring Device Interface Components for Content Sharing," filed Mar. 10, 2011, U.S. Appl. No. 13/045,292.

Cha, Tae-Woo, et al., Patent Application entitled "Device Experience Adaptation Based on Schedules and Events," filed Feb. 16, 2011, U.S. Appl. No. 13/029,103.

Smith, Nathan A., et al., Patent Application entitled "Restricted Testing Access for Electronic Device," filed Jun. 16, 2011, U.S. Appl. No. 13/161,496.

Delker, Jason R., et al., Patent Application entitled "Ad Sponsored Communication Pack," filed Feb. 18, 2011, U.S. Appl. No. 13/031,123.

Ackerman, Samuel K., "Lecture Slides: Mapping User Interface Design to Culture Dimensions", Aaron Marcus and Associates, Inc., 2001.

Kenja's Newsletter, About Newsletter, http://kenja.net/news.main.html, printed from the World Wide Web, "last modified Fri, Oct. 10, 2003".

Openwave, "Comparison of WAP Push and Short Message Service (SMS)," Openwave Systems, Inc., Redwood City, CA, Apr. 2002.

Qualcomm, uiOne™, http://brew.qualcomm.com/brew/in/about/uione.html.

Scansoft press release, "Scansoft Launches SpeechPAK Healthcare Suite 2.0", http://dragontranscription.com/press-releases-articles-february-2005/scansoft-launches-speechpak-healthcare-suite-2.0,html, Feb. 17, 2005.

Stanford Technology Ventures Program, "Danger, Inc.: Powering the Next Generation of Mobile Technology", Oct. 15, 2003.

Office Action dated Apr. 15, 2008, U.S. Appl. No. 11/046,083, filed Jan. 28, 2005.

Final Office Action dated Oct. 28, 2008, U.S. Appl. No. 11/046,083, filed Jan. 28, 2005.

Office Action dated Aug. 15, 2011, U.S. Appl. No. 12/330,759, filed Dec. 9, 2008.

Office Action dated Apr. 3, 2008, U.S. Appl. No. 11/333,964, filed Jan. 17, 2006.

Final Office Action dated Oct. 8, 2008, U.S. Appl. No. 11/333,964, filed Jan. 17, 2006.

Final Office Action dated Jan. 21, 2009, U.S. Appl. No. 11/333,964, filed Jan. 17, 2006.

Advisory Action dated Apr. 13, 2009, U.S. Appl. No. 11/333,964, filed Jan. 17, 2006.

Office Action dated Jun. 23, 2009, U.S. Appl. No. 11/333,964, filed Jan. 17, 2006.

Final Office Action dated May 11, 2010, U.S. Appl. No. 11/333,964, filed Jan. 17, 2006.

Advisory Action dated Jul. 22, 2010, U.S. Appl. No. 11/333,964, filed Jan. 17, 2006.

Wolter, Eric, Patent Application entitled "Method and System for Calendar-Based Delivery of Themed User-Interface Skins," filed Dec. 9, 2008, U.S. Appl. No. 12/330,759.

Wolter, Eric S., Patent Application entitled "Method and System for Delivery of User-Interface Skins, Applications, and Services to Wireless Devices," filed Jan. 17, 2006, U.S. Appl. No. 11/333,964.

Katzer, Robin Dale, et al., Patent Application entitled "Zone Architecture for Dynamic Targeted Content Creation," filed Oct. 11, 2011, U.S. Appl. No. 13/271,207.

(56) References Cited

OTHER PUBLICATIONS

Office Action—Restriction Requirement dated Feb. 1, 2012, U.S. Appl. No. 12/876,221, filed Sep. 6, 2010.
Foreign Communication From a Related Counterpart Application—International Search Report and Written Opinion, PCT/US2013/052805 Oct. 4, 2013.
Advisory Action dated Aug. 6, 2013, U.S. Appl. No. 13/018,083, filed Jan. 31, 2011.
Final Office Action dated Sep. 10, 2013, U.S. Appl. No. 13/118,058, filed May 27, 2011.
Office Action—Restriction Requirement dated Aug. 26, 2013, U.S. Appl. No. 13/031,123, filed Feb. 8, 2011.
Delker, Jason R., et al., Patent Application entitled "System and Method for ID Platform," filed Sep. 5, 2013, U.S. Appl. No. 14/019,053.
Delker, Jason R., et al., Patent Application entitled "Dynamic Loading, Unloading, and Caching of Alternate Complete Interfaces," filed Sep. 30, 2013, U.S. Appl. No. 14/042,707.
Annan, Brandon C., et al., International Application entitled, "Traffic Management of Third Party Applications", filed Jul. 24, 2013, U.S. Appl. No. PCT/US13/52805.
Annan, Brandon C., et al., Patent Application entitled, "Traffic Management of Third Party Applications", filed Jul. 31, 2012, U.S. Appl. No. 13/536,709.
FAIPP Pre-Interview Communication dated Jul. 19, 2012, U.S. Appl. No. 13/018,083, filed Jan. 31, 2011.
Cha, Tae-Woo, et al., Patent Application entitled, "Device Experience Adaptation Based on Schedules and Events," filed Jun. 29, 2012, U.S. Appl. No. 13/537,563.
Pre-Interview Communication dated Feb. 26, 2013, U.S. Appl. No. 13/023,486, filed Feb. 8, 2011.
Final Office Action dated Jan. 11, 2013, U.S. Appl. No. 12/876,221, filed Sep. 6, 2010.
Pre-Interview Communication dated Feb. 26, 2013, U.S. Appl. No. 13/118,058, filed May 27, 2011.
Office Action dated Mar. 14, 2013, U.S. Appl. No. 13/161,496, filed Jun. 16, 2011.
Delker, Jason R., et al., Patent Application entitled "Transition Experience During Loading and Updating an Interface and Applications Pack," filed Oct. 24, 2012, U.S. Appl. No. 13/659,889.
FAIPP Office Action dated May 10, 2012, U.S. Appl. No. 12/876,221, filed Sep. 6, 2010.
Notice of Allowance dated Mar. 30, 2012, U.S. Appl. No. 13/029,103, filed Feb. 16, 2011.
Notice of Allowance dated Jun. 4, 2013, U.S. Appl. No. 13/023,486, filed Feb. 8, 2011.
Advisory Action dated Apr. 23, 2013, U.S. Appl. No. 12/876,221, filed Sep. 6, 2010.
Notice of Allowance dated Jul. 2, 2013, U.S. Appl. No. 12/876,221, filed Sep. 6, 2010.
Final Office Action dated May 10, 2013 U.S. Appl. No. 13/018,083, filed Jan. 31, 2011.
First Action Interview Office Action dated May 6, 2013, U.S. Appl. No. 13/118,058, filed May 27, 2011.
Notice of Allowance dated Apr. 29, 2013, U.S. Appl. No. 13/537,563, filed Jun. 29, 2012.
Notice of Allowance dated Jun. 27, 2013, U.S. Appl. No. 13/161,496, filed Jun. 16, 2011.
Office Action dated Dec. 26, 2013, U.S. Appl. No. 13/018,083, filed Jan. 31, 2011.
Advisory Action dated Nov. 22, 2013, U.S. Appl. No. 13/118,058, filed May 27, 2011.
Office Action dated Dec. 17, 2013, U.S. Appl. No. 13/031,123, filed Feb. 18, 2011.
Pre-Interview Communication dated Mar. 28, 2014, U.S. Appl. No. 14/019,053 filed Sep. 5, 2013.
Final Office Action dated Apr. 3, 2014, U.S. Appl. No. 13/018,083, filed on Jan. 31, 2011.
Advisory Action dated Jun. 9, 2014, U.S. Appl. No. 13/018,083, filed on Jan. 31, 2011.
Office Action dated Mar. 18, 2014, U.S. Appl. No. 13/118,058, filed on May 27, 2011.
Pre-Interview Communication dated Jun. 9, 2014, U.S. Appl. No. 13/271,207, filed on Oct. 11, 2011.
Pre-Interview Communication dated Mar. 21, 2014, U.S. Appl. No. 13/537,610, filed on Jun. 29, 2012.
Notice of Allowance dated May 18, 2014, U.S. Appl. No. 13/537,610, filed on Jun. 29, 2012.

\* cited by examiner

PROVISIONING SYSTEM AND METHODS FOR INTERFACELESS PHONE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Activities associated with the development and presentation of the user interface of portable electronic devices comprise interaction design, user interface design, user experience, and usability testing and analysis. Examination and analysis of social trends related to mobile devices is also a component of developing a successful user interface. A well configured mobile phone may detect information about the user's situation and may alert the user when attention may be required. The mobile phone may use components to understand the user's situation and provide information that may be useful or vital. Mobile phone user interfaces may make personal style statements as well as provide customized and valuable functionality and increased productivity. Design of the user interface goes beyond how the visible components in the interface appear to the user. Design extends to how the components, both visible to the user and executing in the background, function and interoperate with one another. The importance of good user interface design can be the difference between product acceptance and rejection in the marketplace. If users feel a mobile phone model is not easy to learn or use, an otherwise excellent product could fail.

SUMMARY

A portable electronic device is provided comprising a processor, a memory, and a provisioning application, that, when executed on the portable electronic device, detects that the portable electronic device has powered on and received activation for at least one of voice and data wireless services. The portable electronic device also receives a first input selecting installation of an interface pack on the portable electronic device. The portable electronic device also receives the interface pack from a remote software distribution site, wherein the interface pack comprises a software installer, a first user application, and a second user application. The portable electronic device executes the software installer wherein the software installer installs the first user application and installs the second user application on the portable electronic device.

A processor-implemented method is provided comprising a mobile device, after initial power on, activation, and reboot, displaying a graphical interface providing an option to install one of a plurality of available interface packs. The method also comprises the mobile device receiving a first input, the first input selecting the option and a client module executing on the mobile device accessing a remote software distribution site in response to the selection of the option; The method also comprises the mobile device displaying information about the plurality of available interface packs, the interface packs available for downloading from the remote software distribution site. The method also comprises the mobile device receiving a second input, the second input selecting one of the plurality of available interface packs. The method also comprises the mobile device receiving the selected interface pack from the remote software distribution site and the mobile device installing the selected interface pack in response to receiving a third input.

A processor-implemented method is provided comprising a mobile device receiving a first input to execute a software installer, wherein the software installer has been downloaded from a remote software distribution site. The method also comprises the software installer accessing an interface pack downloaded from the remote software distribution site to the mobile device, the interface pack comprising a first application, a second application, and a third application. The method also comprises the software installer installing the first application, the second application, and the third application on the mobile device. The method also comprises the mobile device activating a style guide downloaded from the remote software distribution site.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and methods of provisioning an initially interfaceless portable electronic device with a bundle of trusted applications in a streamlined installation process wherein the applications become the user interface for the device. When a newly received portable electronic device, for example a mobile telephone, is first powered on, it may self-activate its account for wireless services with a telecommunications service provider. Upon reboot, a provisioning application taught herein executes on the device and provides the user access to a remote software repository. The repository contains a selection of interface packs, each comprising customized bundles of precertified, trusted applications. The interface pack selected by the user is downloaded to the portable electronic device, uncompressed, and installed by a custom software installer toolset included with the interface pack. The installation takes place automatically without user action. The applications are installed and automatically configured to comprise the interface and user experience for the device.

The provisioning of interface packs made available for download and installation on the portable electronic device may depend on policies of the telecommunications service provider or other content provider and may depend on a profile associated with the portable electronic device and/or its user. The composition of interface packs may be based on subjects, topics, or profiling. Interface packs may comprise a variety of software, scripts, and content such as web widgets, tiles, really simple syndication (RSS) feed icons, media players, wallpapers, ring tones, and listings of internet links. While the installation process of the interface pack is comprehensive and may entail minimal or no user action, once installation is complete, a style guide included with the applications may be consulted, and the user may delete or reconfigure the applications.

After the applications from a selected interface pack are downloaded, installed, and executing and the user interface is operational, the user is provided the ability to select and install a second or substitute interface pack that may temporarily or permanently replace the initial interface pack. The user may locally or remotely cache portions of the removed interface pack and later restore the removed interface pack with time-sensitive portions of the restored interface pack updated with current content. Temporary or permanent interface packs beyond the initial interface pack may be downloaded from content sources other than the telecommunications service provider and become the user interface. Other content sources, for example retailers and entertainment and media sources, may create their own customized interface packs that the telecommunications service provider may review and approve for automated installation on the portable electronic device.

Figure 1:
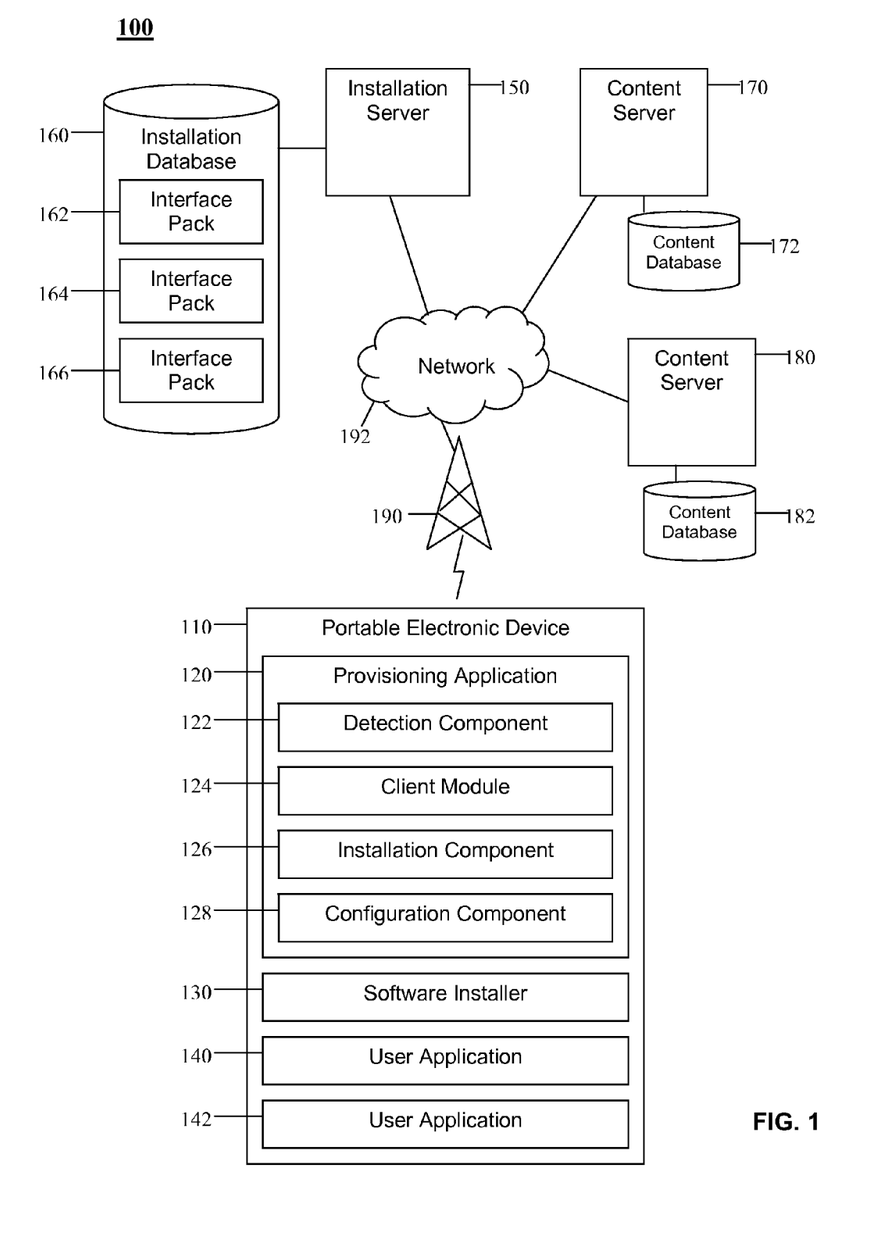
FIG. 1 is a block diagram of a system according to an embodiment of the disclosure.

Turning now to FIG. 1, a system 100 of provisioning for interfaceless phones is provided. The system 100 comprises a portable electronic device 110, a provisioning application 120, a software installer 130, user applications 140, 142, an installation server 150, an installation database 160, interface packs 162, 164, 166, a content server 170, 180, a base transceiver station 190, and a network 192.

The provisioning application 120 executes on the portable electronic device 110. Portable electronic devices 110 are described in detail hereinafter. The provisioning application 120 detects that the portable electronic device 110 has received initial activation from a provider of at least one of wireless voice and data services and has thereafter rebooted. The provisioning application 120 then provides an option to load and install one of the interface packs 162, 164, 166 from the installation database 160 containing user applications 140, 142 that may upon installation comprise the user interface for the portable electronic device 110. When the option is selected, a client module 124 of the provisioning application 120 contacts the installation server 150 and downloads the selected interface pack 162, 164, 166. The software installer 130 is included in the interface pack 162. At the instruction of the provisioning application 120, the software installer 130 installs and configures the user applications 140, 142 on the portable electronic device 110.

After the portable electronic device 110 is initially powered on and activates for at least one of voice and data service with a telecommunications service provider, the portable electronic device 110 may then reboot. At this point the portable electronic device 110 may have no applications installed and available. While the portable electronic device 110 is activated for access to telecommunications services, there effectively may be no user interface or user experience available. After rebooting, the portable electronic device 110 may present an option to one of dial 911, the emergency telephone number for the North American Numbering Plan (NANP), and download an interface pack 162, 164, 166 containing user applications 140, 142 and other content that, when uncompressed and installed, become the user interface for the portable electronic device 110. The provisioning application 120 provides the user the opportunity to select from the plurality of interface packs 162, 164, 166, each of which may contain a variety of user applications 140, 142. At least one of the interface packs 162, 164, 166 may be downloaded along with the software installer 130. At the instruction of the provisioning application 120, the software installer 130 uncompresses and installs the downloaded interface pack 162. Although the user interface comprising the user applications 140, 142 and other content may be fully user-ready, the user of the portable electronic device 110 then has the flexibility to configure the user applications 140, 142 as well as delete one, some, or all of the user applications 140, 142.

The user applications 140, 142 and other may comprise a plurality of application types, scripts, and content that together comprise the interface or user experience for the portable electronic device 110. The user applications 140, 142, scripts, and content may comprise web widgets, tiles, really simple syndication (RSS) feed icons, media players, wallpapers, ring tones, and listings of links. The user applications 140, 142 may also comprise software components installed on the portable electronic device 110 that may periodically access some services available from remote sources over networks, including the internet. Such services may comprise taking delivery of content and displaying content in the banner and elsewhere in the portable electronic device 110 and may comprise receiving and displaying regular messages or announcements from external sources. Each interface pack 162, 164, 166 may contain a unique combination of different user applications 140, 142, scripts, and content that, beyond software modules installed on the portable electronic device 110 and available for use at the election of the user, additionally comprise a full user interface, including interactive and regularly refreshed content, some customizable according to the user's tastes and preferences. In an embodiment, the portable electronic device 110 may download more than one interface pack 162, 164, 166 and combine user applications 140, 142, scripts, and content taken from the different interface packs 162, 164, 166. Interface packs 162, 164, 166 may combine, package, or bundle user applications 140, 142, scripts, and content by subject type, motif, or unifying idea. A first user of the portable electronic device 110 may download the interface pack 162 that provides user applications 140, 142, scripts, and content centered around business subjects and productivity tools. A second user of a different portable electronic device 110 may download the interface pack 164 providing user applications 140, 142, scripts, and content involving popular music and contemporary culture. A third user of yet a third portable electronic device 110 may download the third interface pack 166 providing user applications 140, 142, scripts, and content associated with family and homemaking activities. Interface packs 162, 164, 166 may alternatively comprise general user applications 140, 142, scripts, and content that may be appropriate and useful to general user audiences. Each interface pack 162, 164, 166 may contain a style guide that may be used to configure the user applications 140, 142, including positioning of icons associated with the user applications 140, 142 in the display of the portable electronic device 110.

The installation server 150 may be associated with the telecommunications service provider that the portable electronic device 110 may contact to obtain some voice and data services that may be accessible via installation of at least one interface pack 162, 164, 166. The installation server 150 may apply policies and request authentication credentials from the user of the portable electronic device 110 before providing a listing of available interface packs 162, 164, 166 from the installation database 160 to the portable electronic device 110 for selection. The installation server 150 may examine a profile associated with the portable electronic device 110 or its user. Based on policies applied to the subscription or other account of the portable electronic device 110 or based on other criteria, for example parental controls, wireless or other service plan, and contents of device and/or user profiles, the installation server 150 may restrict the interface packs 162, 164, 166 that it makes available to the portable electronic device 110. In an embodiment, the installation server 150 may be associated with an entity other than the telecommunications service provider and may provide its own precertified and customized bundle of user applications 140, 142 and automated install routines to portable electronic devices 110 under a contractual or other arrangement with the telecommunications service provider.

The software installer 130 is supplied by the installation server 150 with the interface packs 162, 164, 166 and is used to uncompress and install the user applications 140, 142, scripts, and content. The user applications 140, 142 are trusted by the portable electronic device 110 and accordingly are installed using scripts or other automated methods by the software installer 130 that bypass an extensive series of installation steps and restarts of the portable electronic device 110 that may accompany installation of non-trusted applications. The telecommunications service provider or other entity operating the installation server 150 may test and precertify user applications 140, 142, scripts, and content before placing them in interface packs 162, 164, 166. Because the user applications 140, 142, scripts, and content are supplied together in a bundled and integrated manner in interface packs 162, 164, 166, the user applications 140, 142 and associated installation routines are designed such that they interact smoothly with each other during installation and operation regardless of how they are combined. The integrated method of installation of user applications 140, 142, scripts, and content as taught herein may contrast with more traditional and standard step-by-step approaches wherein applications may not have been tested together and problems may occur after installation. With the previous step-by-step methods, each application may have to be separately installed as if it were the sole application being installed, with the device restarted after each application is installed. Since interactions between individual applications may not be known under previous methods, the device may lock up, crash, or behave unexpectedly after an application is installed and the device restarted. Significant user intervention may be required under these previous methods and software or operational workarounds may be required to achieve functionality. The software installer 130 may use various software components and routines during installation to assure that the interactions between user applications 140, 142 function as designed after installation. The present disclosure teaches that the provisioning application 120 directs the software installer 130 by default to install each of the user applications 140, 142 contained in a downloaded interface pack 162 and that the user of the portable electronic device 110 has the option to selectively uninstall individual user applications 140, 142 after installation. The user applications 140, 142, the software installer 130, and supporting components used for installation and configuration are designed such that user applications 140, 142 in various combinations still interact as designed with each other regardless of which individual user applications 140, 142 the user of the portable electronic device 110 may decide to uninstall.

The functionality of the provisioning application 120 and other components of the system 100 have been described in reference to the initial provisioning of the portable electronic device 110 after activation with the telecommunications service provider. The described initial provisioning provides the portable electronic device 110 with user applications 140, 142 that may comprise the default user interface or default user experience. The present disclosure also teaches the temporary and permanent substitution of other user applications 140, 142 provided by other interface packs 162, 164, 166 that may be provided by the installation server 150 or by other sources. The user of the portable electronic device 110, after installing a first set of user applications 140, 142 from a first interface pack 162, may decide to temporarily or permanently substitute a different set of user applications 140, 142 from a second interface pack 164 wherein the different set of user applications 140, 142 then becomes the user interface for the portable electronic device 110. The first or original set of user applications 140, 142 may be cached on the portable electronic device 110, on the installation server 150, or elsewhere, and later may be restored with their versions refreshed. The first or original set of user applications 140, 142 may alternatively be deleted.

Additional, secondary, or substitute sets of user applications 140, 142 that temporarily or permanently take the place of the initial or subsequent set of user applications 140, 142 may be provided by parties other than the telecommunications service provider. Such parties may be commercial entities and the user applications 140, 142 these entities provide comprising the described additional user interfaces may be based on promoting the commercial or other interests of these parties. The ability to load these user applications 140, 142 provided by these entities may be based on the proximity of the portable electronic device 110 to commercial and other venues associated with these entities and based on the portable electronic device 110 being qualified to receive these user applications 140, 142. FIG. 1 additionally depicts content servers 170, 180 and their respective content databases 172, 182 that may be associated with these entities other than the telecommunications service provider. For further details about the described interchangeable user interfaces provided by such commercial and other entities, see U.S. patent application Ser. No. 12/876,221, filed Sep. 6, 2010, entitled "Dynamic Loading/Unloading/Caching of Alternate Complete Interfaces" by Jason Delker, et al., which is herein incorporated by reference.

There may be little or no difference between interface packs 162, 164, 166 provided by the telecommunications services provider and interface packs 162, 164, 166 provided by other parties, for example commercial entities. While interface packs 162, 164, 166 provided by a commercial entity may be themed around the commercial and business interests of the entity, the content itself and the underlying software enabling the content to function, together comprising user applications 140, 142, may be as legitimate and durable as user applications 140, 142 drawn from interface packs 162, 164, 166 provided by the telecommunications services provider. Such commercially provided interface packs 162, 164, 166 and their component user applications 140, 142 may be certified and approved by the telecommunications services provider for use on the portable electronic device 110 with testing completed and installation routines meeting the standards of the telecommunications services provider. Although interface packs 162, 164, 166 may be obtained from a commercial entity, perhaps while on the premises of the commercial entity, the user applications 140, 142 provided therein may be useful in a plurality of locations not associated with the commercial entity. In an embodiment, user applications 140, 142 drawn from an interface pack 162 provided by a commercial entity may become the primary and permanent user interface executing on the portable electronic device 110.

Conversely, interface packs 162, 164, 166 and their component user applications 140, 142 provided by telecommunications services providers, including a telecommunications services provider that may sponsor a program to permit portable electronic devices 110 to be initially provisioned in the manners taught herein, may promote their own commercial interests in their various interface packs 162, 164, 166. An interface pack 162 provided by the telecommunications services provider that sells the portable electronic device 110 to the user may include a plurality of promotional items directed to inducing the user to purchase additional products and services from the telecommunications services provider or other parties with which the telecommunications services provider has business relationships.

The portable electronic device 110 may be a mobile telephone, a media player, and a personal digital assistant (PDA). In addition to having a radio transceiver to exchange transmissions with the base transceiver station 190 for wireless voice and data communications, the portable electronic device 110 also may contain hardware and software providing WiFi functionality that may be used in connection with the portable electronic device 110 visiting commercial and other venues as described above. The portable electronic device 110, alternatively or in addition to WiFi technology, may comprise other hardware and software associated with other wireless local area network technologies that may observe the IEEE (Institute of Electrical and Electronics Engineers) 802.11 set of standards.

The base transceiver station 190 may be any of a cellular wireless base station, for example a Code Division Multiple Access (CDMA), a Global System for Mobile Communications (GSM), a Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 190, in an embodiment a plurality of base transceiver stations 190 may be existent and in operation.

The network 192 promotes communication between the components of the system 100. The network 192 may be any communication network including a public data network (PDN), a public switched telephone network (PSTN), a private network, and/or a combination.

The provisioning application 120 comprises the detection component 122 that, when the portable electronic device 110 is new, "out of the box", and does not have a user interface comprising installed applications or other components, detects that activation or self-activation by the portable electronic device 110 has taken place. Such self-activation may comprise initial power on, contact with the telecommunications service provider to link the account of the user with the portable electronic device 110, and reboot by the portable electronic device 110. These steps may involve no action by the user of the portable electronic device 110 other than initially powering on the portable electronic device 110 after removing the portable electronic device 110 from its packaging. Once the initial activation has taken place and the portable electronic device 110 has rebooted, the detection component 122 may present a screen that provides an option to download one interface pack 162, 164, 166 containing user applications 140, 142 that may be configured to comprise the user interface of the portable electronic device 110.

The provisioning application 120 also comprises the client module 124. After the portable electronic device 110 has self-activated and rebooted and the detection component 122 presents the option to download an interface pack 162, 164, 166, if the option to do so is chosen, the client module 124 of the provisioning application 120 activates. The client module 124 may access web browser functionality executing on the portable electronic device 110 to make contact with the installation server 150 and request an interface pack 162, 164, 166. The installation server 150 receives the transmission from the client module 124, identifies the portable electronic device 110 sending the transmission, and may examine a profile associated with the portable electronic device 110. Profiles may describe limitations about the type of interface packs 162, 164, 166 that may be downloaded. Profiles may contain parental controls, for example, or for business users, may prescribe the downloading of interface packs 162, 164, 166 containing specific user applications 140, 142 related to users' business responsibilities. The installation server 150 also may examine any policies that apply to the portable electronic device 110, for example policies describing limitations about interface packs 162, 164, 166 that may be provided to the portable electronic device 110. The installation server 150 performs the described profile and policy filtering associated with the portable electronic device 110, creates a qualified listing of available interface packs 162, 164, 166 stored in the installation database 160, and sends the listing to the portable electronic device 110. The portable electronic device 110 displays the listing of interface packs 162, 164, 166 and may provide information about user applications 140, 142 provided by each interface pack 162, 164, 166. The user of the portable electronic device 110 then may select an interface pack 162 for installation. Once the interface pack 162 is selected, it may be downloaded as a single bundle by the portable electronic device 110 in compressed format along with the software installer 130.

The provisioning application 120 also comprises the installation component 126. Once the client module 124 selects the option to download an interface pack 162, 164, 166, the provisioning application 120 contacts the installation server 150, the installation server 150 performs any necessary filtering and presents available interface packs 162, 164, 166, and the portable electronic device 110 selects and downloads one of the interface packs 162, 164, 166, installation may begin. The installation component 126 directs the software installer 130 to uncompress the interface pack 162. The software installer 130 processes this instruction and the interface pack 162 uncompresses, making the user applications 140, 142 ready for installation on the portable electronic device 110. The software installer 130 then may follow automated installation scripts or routines provided by the interface pack 162 to perform a default installation of the user applications 140, 142. The software installer 130 may follow additional instructions provided by the installation component 126 that may be specific to the technical specifications of the portable electronic device 110, for example the screen resolution, processor and memory capacity, and native language of the portable electronic device 110. A user agent of the browser functionality used to access the installation server 150 may provide this device-specific information. The installation component 126 and software installer 130 may manipulate some settings of the portable electronic device 110 and/or the user applications 140, 142 to permit the user applications 140, 142 to install and function as designed. The installation process of the user applications 140, 142 takes place with minimal or no intervention by the user of the portable electronic device 110.

The installation component 126 also completes setup of network services that may accompany the interface pack 162. While network services may not comprise a user application 140 per se, network services are items of value, access to which may be available through the interface pack 162. Network services may be acquired through the interface pack 162 on a subscription basis from a services provider, for example, that may operate the content server 170. Installation of the user application 140 that may include access to network services may comprise installing software components on the portable electronic device 110 that periodically generate transmissions to external providers of services and request information, messages, news, or other items that may be periodically refreshed. These software components may differ from widgets or internet links that may be also be periodically accessed.

The provisioning application 120 also comprises a configuration component 128. After the installation component 126 and the software installer 130 have installed the user applications 140, 142, the user of the portable electronic device 110 may wish to make changes to the configuration, including deleting at least one of the user applications 140, 142 and repositioning icons or pointers in the display of the portable electronic device 110. The user may reconfigure user applications 140, 142 that comprise web widgets. As used herein, web widgets may be actively executing user applications 140, 142 represented by icons or other small figures or images that may display content received on a real time or near real time basis from an external source, for example an internet web site. Web widgets may be hypertext markup language (HTML) packages of code that may use really simple syndication (RSS) and other technologies to elevate the data experience to the icon on the display of the portable electronic device 110. Examples of web widgets comprise the reporting of a score of a currently ongoing sporting event or the reporting of stock market prices. The configuration component 128 also may activate when the user of the portable electronic device 110 downloads a new interface pack 164 to take the place of the previous or default interface pack 162 downloaded earlier.

The configuration component 128 may be useful when the installed user applications 140, 142 from the initial or currently installed interface pack 162 are to be permanently or temporarily replaced by user applications 140, 142 from a substitute or alternate interface pack 164. The user may cache or save the existing user applications 140, 142. Since substituting the contents of the alternate interface pack 164 for the installed user applications 140, 142 effectively results in replacing a first user interface with a second user interface, the user may wish to return at a later date to the first user interface originally installed. The configuration component 128 may be used to designate that the user applications 140, 142 that represent the first user interface are not deleted but are instead fully or partially cached, either on the portable electronic device 110 or in a remote storage device, perhaps associated with the installation server 150.

In an embodiment, template files and user application settings associated with the removed user applications 140, 142 may remain cached and other files associated with the removed user applications 140, 142 may be deleted. When the user of the portable electronic device 110 elects to restore the user applications 140, 142, thereby returning to the earlier user interface, the components of the provisioning application 120 may download a substantially new replacement interface pack 162. Some user applications 140, 142 may be frequently changed, updated, or refreshed and it may be advantageous for the caching of files associated with the user applications 140, 142 to be limited to their template files and user application settings. The template files and user application settings may be cached locally in the portable electronic device 110 or cached remotely, for example in the installation server 150 or in the installation database 160.

Because template files and user applications settings may be considerably smaller in size than the full interface packs 162, 164, 166 that they support, the portable electronic device 110 may store locally or remotely a plurality of template files and application settings. Some of the template files and application settings may be personalized, similar to an identification for a user, and activated at the election of the user. The current version of the application pack 162 corresponding to the desired template file may be downloaded and installed at specific times of day, days of the week, or seasons of the year. Configurations made and stored for a given template file and accompanying application settings may cause the template to activate automatically upon occurrence of a predetermined event. Other template files and application settings may be activated and the current corresponding application pack 162 installed when the portable electronic device 110 is in a specific geographic location, for example a different city than the location of the user's residence. Because template files and application settings may be stored in remote servers, there may be fewer limitations on the quantity and type of interface packs 162, 164, 166 that the user may download and enjoy.

Figure 2:
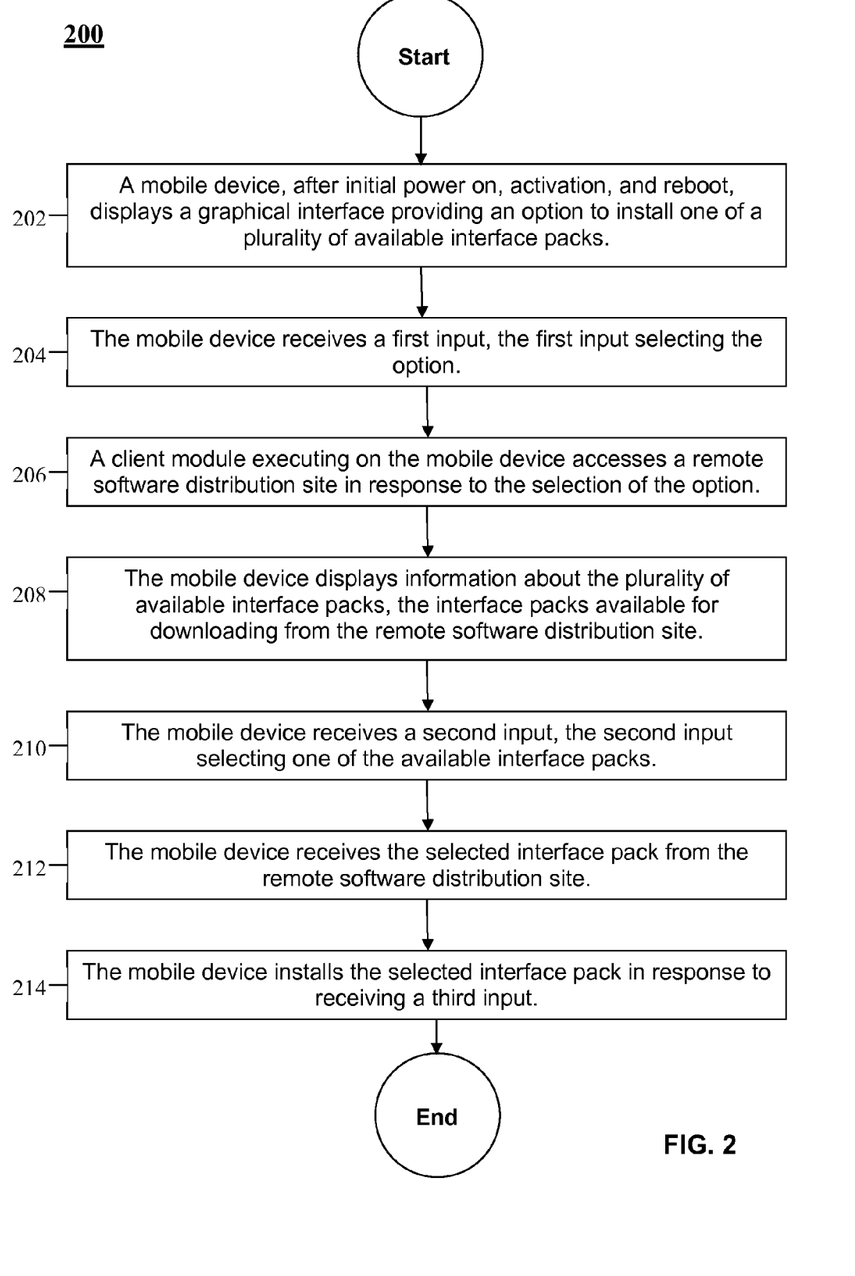
FIG. 2 is a flow chart illustrating a method according to an embodiment of the disclosure.

Turning now to FIG. 2, a processor-implemented method 200 is provided. Beginning at block 202, a mobile device, that may be the portable electronic device 110, after initial power on, activation, and reboot, displays a graphical interface providing an option to install one of a plurality of available interface packs 162, 164, 166. At block 204, the mobile device receives a first input, the first input selecting the option. The election has been made to download one of a plurality of interface packs 162, 164, 166 and install the user applications 140, 142 contained therein onto the mobile device.

At block 206, the client module 124 of the provisioning application 120 executing on the mobile device accesses a remote software distribution site in response to the selection of the option. The remote software distribution site may be the installation server 150 and its associated installation database 160. At block 208, the mobile device displays information about the plurality of interface packs 162, 164, 166 that are available for downloading from the remote software distribution site.

At block 210, the mobile device receives a second input, the second input selecting one of the plurality of available interface packs 162, 164, 166. At block 212, the mobile device receives the selected interface pack 162 from the remote software distribution site. At block 214, the mobile device installs the selected interface pack 162 in response to receiving a third input. The installation component 126 works with the software installer 130 to uncompress the interface pack 162 and install the user applications 140, 142 on the mobile device.

Figure 3:
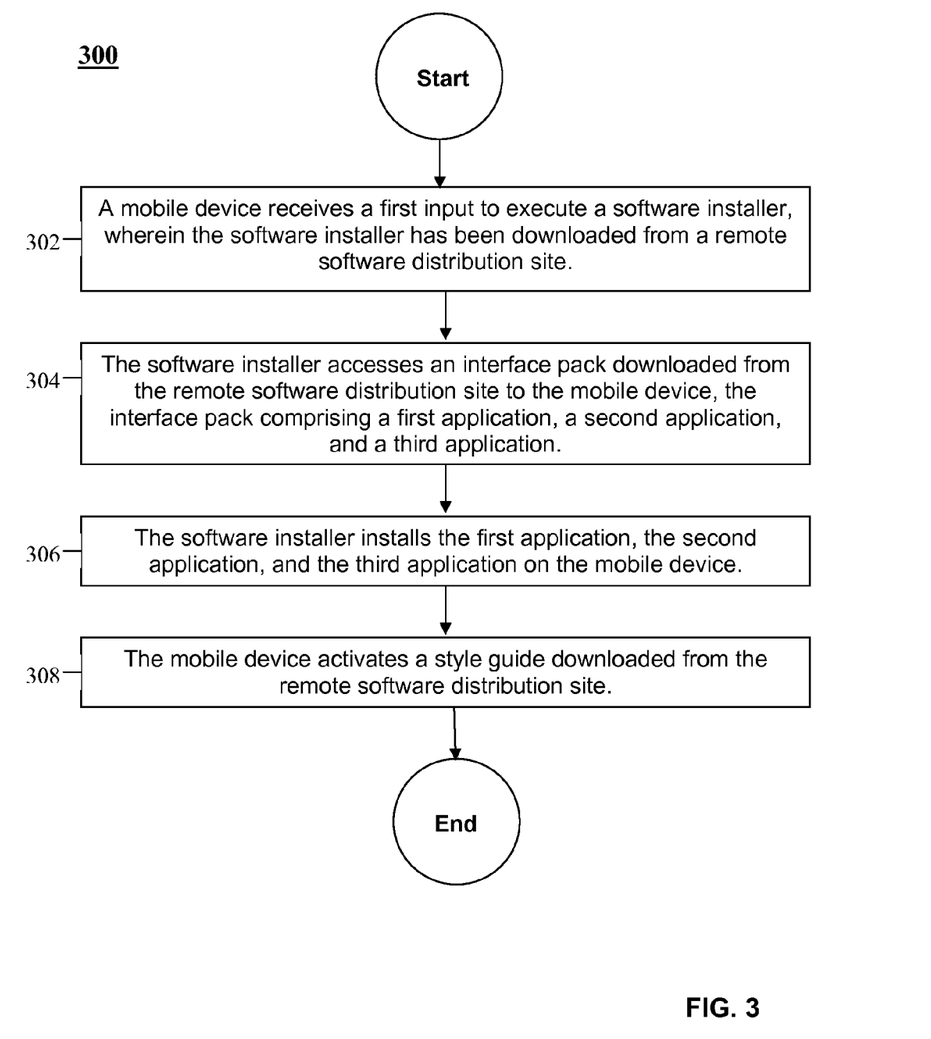
FIG. 3 is a flow chart illustrating a method according to an embodiment of the disclosure.

Turning now to FIG. 3, a processor-implemented method 300 is provided. Beginning at block 302, a mobile device receives a first input to execute the software installer 130, wherein the software installer 130 has been downloaded from a remote software distribution site. At block 304, the software installer 130 accesses an interface pack 162 downloaded from the remote software distribution site to the mobile device, the interface pack 162 comprising a first application, a second application, and a third application.

At block 306, the software installer 130 installs the first application, the second application, and the third application on the mobile device. At block 308, the mobile device activates a style guide downloaded from the remote software distribution site.

Figure 4:
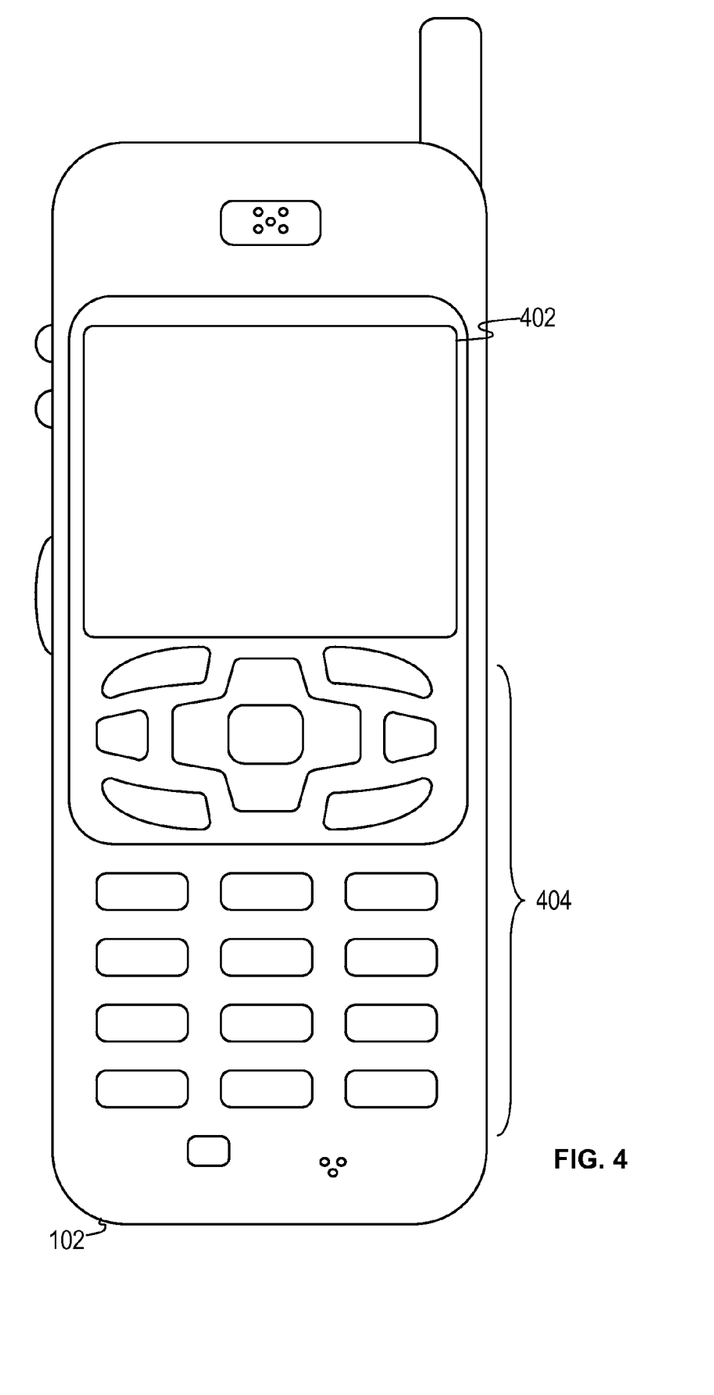
FIG. 4 is an illustration of a mobile device according to an embodiment of the disclosure.

FIG. 4 shows a mobile device 102. FIG. 4 depicts the mobile device 102, which is operable for implementing aspects of the present disclosure, but the present disclosure should not be limited to these implementations. The mobile device 102 may in some embodiments exemplify the portable electronic device 110 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

Figure 5:
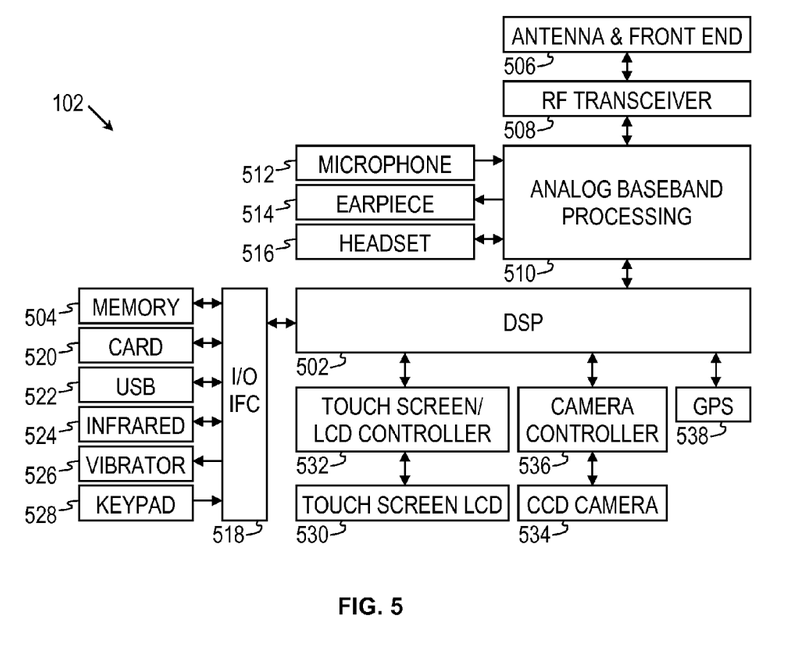
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
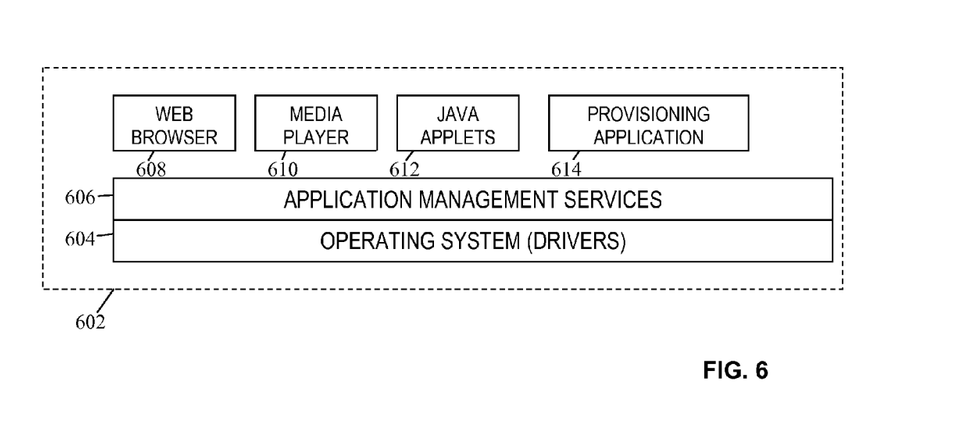
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The provisioning application 614 may correspond to the provisioning application 120 provided by the system 100.

Figure 7:
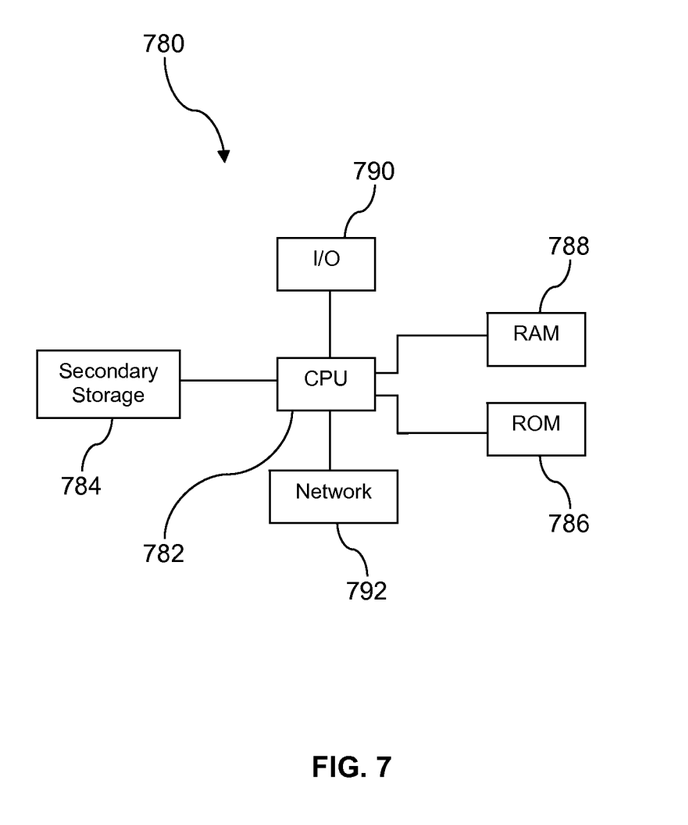
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as non-transitory storage and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An initially interfaceless portable electronic device, comprising:
    a processor;
    a memory; and
    a provisioning application, that, when executed on the initially interfaceless portable electronic device,
        detects that the initially interfaceless portable electronic device has powered on and received activation for at least one of voice and data wireless services,
        in response to the detection, displays a graphical interface on the initially interfaceless portable electronic device providing an option to install an interface pack on the initially interfaceless portable electronic device,
        receives an input selecting the option to install the interface pack on the initially interfaceless portable electronic device,
        receives the interface pack as a single bundle from a remote software distribution site, wherein the interface pack comprises a software installer, a first user application, and a second user application, and
        executes the software installer, wherein the software installer installs the first user application and installs the second user application on the initially interfaceless portable electronic device, and wherein installation of the first user application and the second user application provides an initial user interface to the initially interfaceless portable electronic device.

2. The system of claim 1, wherein the provisioning application detects that the initially interfaceless portable electronic device has received activation for at least one of voice and data wireless services after the initially interfaceless portable electronic device is initially powered on, activates with a provider of at least one of voice and data wireless services, and reboots.

3. The system of claim 1, wherein the provisioning application executes a second input to uninstall the second user application from the initially interfaceless portable electronic device.

4. The system of claim 1, wherein the first user application and the second user application comprise the user interface for the initially interfaceless portable electronic device.

5. The system of claim 1, wherein the remote software distribution site is associated with at least one of a content provider and a telecommunications service provider.

6. The system of claim 1, wherein the first user application and the second user application comprise at least one of web widgets, really simple syndication (RSS) feed icons, media players, wallpapers, network services, ring tones, and listings of links.

7. The system of claim 1, wherein the initially interfaceless portable electronic device is one of a mobile telephone, a media player, and a personal digital assistant (PDA).

8. A processor-implemented method of provisioning an initially interfaceless mobile device with an interface pack, comprising:
    after initial power on, activation, and reboot, displaying, by an initially interfaceless mobile device, a graphical interface providing an option to install one of a plurality of available interface packs;
    receiving, by the initially interfaceless mobile device, a first input, the first input selecting the option;
    accessing, by a client module executing on the initially interfaceless mobile device, a remote software distribution site in response to the selection of the option;
    displaying, by the initially interfaceless mobile device, information about a subset of the plurality of available interface packs selected from the plurality of available interface packs, wherein the subset of the plurality of available interface packs is selected based on a profile associated with the initially interfaceless mobile device, and wherein the subset of the plurality of available interface packs is available for downloading from the remote software distribution site;
    receiving, by the initially interfaceless mobile device, a second input, the second input selecting one of the subset of the plurality of available interface packs;
    receiving, by the initially interfaceless mobile device, the selected one of the subset of the plurality of available interface packs as a single bundle from the remote software distribution site; and
    installing, by the initially interfaceless mobile device, the selected one of the subset of the plurality of available interface packs in response to receiving a third input, wherein installation of the selected one of the subset of the plurality of available interface packs provides an initial user interface to the initially interfaceless mobile device.

9. The method of claim 8, wherein the selected one of the subset of the plurality of available interface packs is downloaded in a compressed format.

10. The method of claim 9, wherein a software installer application uncompresses the selected one of the subset of the plurality of available interface packs, the uncompressed interface pack containing at least one user application.

11. The method of claim 9, wherein the software installer application installs the at least one user application on the initially mobile device.

12. The method of claim 8, wherein the software installer application is included in the selected one of the subset of the plurality of available interface packs downloaded from the remote distribution site.

13. The method of claim 8, wherein the client module accesses a web browser.

14. The method of claim 8, wherein the remote distribution site is a web site providing a plurality of trusted user applications associated with at least one of a content provider and a telecommunications service provider.

15. A processor-implemented method of provisioning an initially interfaceless mobile device with an interface pack, comprising:
    after initial power on and activation, displaying, by an initially interfaceless mobile device, a graphical interface providing an option to install an interface pack, the interface pack comprising a first application, a second application, and a third application;

receiving, by the initially interfaceless mobile device, an input selecting the option to install the interface pack on the initially interfaceless mobile device;

executing, by the initially interfaceless mobile device, a software installer, the software installer downloaded as part of the interface pack from a remote distribution site;

accessing, by the software installer, the interface pack downloaded from the remote software distribution site to the initially interfaceless mobile device;

installing, by the software installer, the first application, the second application, and the third application on the initially interfaceless mobile device, wherein installation of the first application, the second application, and the third application provides an initial user interface to the initially interfaceless mobile device; and activating, by the initially interfaceless mobile device, a style guide downloaded from the remote software distribution site, wherein the style guide promotes configuration of at least one of the first application, the second application, and the third application.

16. The method of claim 15, wherein the style guide further promotes configuration of a banner displaying content on the initially interfaceless mobile device and further promotes the display of messages on the initially interfaceless mobile device.

17. The method of claim 16, wherein the style guide additionally promotes placement of at least one of shortcuts and widgets in the display of the initially interfaceless mobile device.

18. The method of claim 15, wherein the software installer by default installs each application contained in the interface pack.

19. The method of claim 18, wherein the software installer provides an option to uninstall at least one of all applications provided by the interface pack and individual applications provided by the interface pack.

20. The method of claim 15, wherein the applications provided by the interface pack are trusted by the initially interfaceless mobile device.

* * * * *